Patented July 8, 1952

2,602,725

UNITED STATES PATENT OFFICE 2,602,725

METHOD OF PRODUCING ZIRCONIUM TETRAFLUORIDE

Harley A. Wilhelm and Kenneth A. Walsh, Ames, Iowa, assignors to the United States of America as represented by the United States Atomic Energy Commission No Drawing. Application March 28, 1951, Serial No. 218,080

4 Claims. (Cl. 23—88)

This invention deals with the production of zirconium tetrafluoride from a zirconium chloride and hydrogen fluoride.

It is an object of this invention to provide a process by which a zirconium tetrafluoride is produced which does not easily hydrolyze in moist air.

It is another object of this invention to provide a process by which a zirconium tetrafluoride is produced which is characterized by its nonhygroscopic character and which thus is free from a tendency to cake.

It is still another object of this invention to provide a process for the production of zirconium tetrafluoride of a relatively high degree of density.

These and other objects are accomplished by contacting a zirconium chloride with gaseous hydrogen fluoride at a temperature of about 50° C. until at least 90% of the chloride has been converted to the fluoride and thereafter continuing fluorination to completion of the reaction at a temperature of approximately 300° C.

It has been found that by carrying out the fluorination in two stages, as has just been set forth, a product of considerably superior qualities is obtained. The treatment at 300° C. is responsible for the nonhydrolyzing and nonhygroscopic properties of the final product. If fluorination is carried out exclusively at a higher temperature, more specifically substantially above 50° C., the product cakes and fluorination cannot readily be brought to completion in the inner regions of the cake. If the fluorination is carried out below 50° C., condensation of the hydrogen fluoride takes place in the reactor which again makes the process poorly efficient. It thus will be obvious that combination of the temperatures forming the crux of the process of the invention is critical. The second step, in addition to causing a product which is stable in moist air, also reconverts any zirconium oxide which might have formed by hydrolysis of the low temperature zirconium tetrafluoride.

The reaction which proceeds according to the equation $ZrCl_4 + 4HF \rightarrow ZrF_4 + 4HCl$ is exothermic and proceeds at low temperature. An analysis of the reaction gases leaving the reaction vessel, and in particular their content of hydrochloric acid, is indicative of the stage and progress of the reaction.

Chlorides found especially well suitable for the process of this invention are zirconium tetrachloride and a complex formed of phosphorus oxychloride and zirconium tetrachloride.

While any apparatus which withstands the corrosive action of the reagents may be used for the process of this invention, particularly good results have been obtained by the use of graphite trays which were enclosed in a copper jacket for the first step and a similarly constructed Monel metal unit for the second step.

In the following, two examples are given for the purpose of illustrating the process of this invention but not with the intention to limit the invention to the details given therein.

Example I

One and one-half inch deep layers of zirconium tetrachloride were filled into cylindrical graphite trays which were stacked on top of each other. In one batch 1500 g. of zirconium tetrachloride was treated. The material was first brought to a temperature of 50° C., and hydrogen fluoride was then introduced into the furnace. The hydrogen fluoride was at a pressure slightly above atmospheric pressure to cause flow of the gas. After six and one-half hours, a yield of 98.5% zirconium tetrafluoride was obtained. This product was very fluffy and hydrolyzed in moist air, whereby it formed hydrogen fluoride. However, when the product was subjected to an aftertreatment consisting in heating for two hours at 300° C. in a hydrogen fluoride atmosphere, the product then obtained no longer hydrolyzed in contact with moist air. This latter step did not change the consistency of the product.

Example II

A complex of zirconium tetrachloride with phosphorus oxychloride was heated in order to remove, by distillation, all of the hafnium contaminating the zirconium chloride. The residue, which melts during this distillation step, was cooled. This solidified residue was then heated to 50° C., and hydrogen fluoride was passed over the heated material at slightly superatmospheric pressure for six and one-half hours. A yield of about 93% zirconium tetrafluoride was obtained. The product obtained was a white, porous solid free from chlorine and phosphorus. The phosphorus probably was volatilized as $POF_3$. This solid product was then ground whereby a fluffy material was obtained. It hydrolyzed easily when in contact with moist air. The material was then converted to a nonhydrolyzable substance by heating it for two hours at 300° C. in a hydrogen fluoride atmosphere.

It is obvious from the two examples that the consistency of the zirconium chloride originally used is not altered by the reaction. If, however, a product of higher density is desirable, the product obtained by the process of this invention may be subjected to a sublimation step at 800° C. in a vacuum, or at substantially reduced pressure, whereby the density of the fluoride is increased.

It will be understood that this invention is not to be limited to the details given herein but that it may be modified within the scope of the appended claims.

What is claimed is:

1. A process for the production of zirconium tetrafluoride, which comprises reacting a zirconium chloride with gaseous hydrogen fluoride at a temperature of about 50° C. until at least 90% of the zirconium compound has been converted to zirconium tetrafluoride, and then reacting the product to completion with hydrogen fluoride at a temperature of about 300° C. whereby a practically nonhydrolyzable zirconium tetrafluoride is produced.

2. The process of claim 1 wherein the zirconium chloride is zirconium tetrachloride.

3. The process of claim 1 wherein the zirconium chloride is a complex between zirconium tetrachloride and phosphorus oxychloride.

4. The process of claim 1 wherein the zirconium tetrafluoride obtained is heated to about 800° C. under reduced pressure whereby the fluoride sublimes and a fluoride of increased density results.

HARLEY A. WILHELM.
KENNETH A. WALSH.

REFERENCES CITED

The following references are of record in the file of this patent:

Wolter, Chemiker Zeitung, volume 32, pages 606–607 (1908).